United States Patent
Watanabe et al.

(10) Patent No.: US 7,820,138 B2
(45) Date of Patent: Oct. 26, 2010

(54) INDIUM OXIDE POWDER AND METHOD FOR PRODUCING SAME

(75) Inventors: Makoto Watanabe, Honjo (JP); Tatsumi Inamura, Honjo (JP); Yoshio Moteki, Honjo (JP)

(73) Assignee: Dowa Mining Co., Ltd., Tokyo (JP)

( * ) Notice: Subject to any disclaimer, the term of this patent is extended or adjusted under 35 U.S.C. 154(b) by 512 days.

(21) Appl. No.: 11/377,702

(22) Filed: Mar. 15, 2006

(65) Prior Publication Data
US 2006/0216224 A1    Sep. 28, 2006

(30) Foreign Application Priority Data
Mar. 22, 2005    (JP)    ............... 2005-080898

(51) Int. Cl.
*C01G 15/00* (2006.01)
*C01G 19/02* (2006.01)

(52) U.S. Cl. ................... 423/624; 423/594.9

(58) Field of Classification Search ............ 423/592.1, 423/594.1, 624, 629, 592.2, 593.1, 594.9, 423/618
See application file for complete search history.

(56) References Cited

U.S. PATENT DOCUMENTS 5,401,701 A * 3/1995 Ogawa et al. ............ 501/134
6,533,966 B1 * 3/2003 Nonninger et al. ....... 252/520.1
2003/0178752 A1   9/2003 Song et al.
2004/0140456 A1 * 7/2004 Hattori et al. .............. 252/500
2005/0008847 A1   1/2005 Kishimoto et al.

FOREIGN PATENT DOCUMENTS

| EP | 0 584 672 | 3/1994 |
|---|---|---|
| JP | 7-42109 | 5/1995 |
| JP | 2000003618 | 1/2000 |
| JP | 2003-277052 | 10/2003 |

* cited by examiner

*Primary Examiner*—Stanley Silverman
*Assistant Examiner*—James Fiorito
(74) *Attorney, Agent, or Firm*—Bachman & LaPointe, P.C.

(57) ABSTRACT

At least one basic precipitant selected from the group consisting of NaOH, KOH, $NH_4OH$, $NH_3$, $NH_4HCO_3$ and $(NH_4)_2CO_3$ is added to an indium salt solution, which contains 0.1 to 3 M of indium, in an adding time of not longer than 24 hours, while the solution is maintained at a temperature of 5 to 95° C. until the equivalent of the basic precipitant reaches an equivalent of 0.5 to 3. Then, a precipitate obtained from the solution by a solid-liquid separation is dried and calcined at a temperature of 570 to 780° C. in an non-oxidizing atmosphere which contains ammonia gas and water vapor.

7 Claims, No Drawings

INDIUM OXIDE POWDER AND METHOD FOR PRODUCING SAME

BACKGROUND OF THE INVENTION

1. Field of the Invention

The present invention generally relates to an indium oxide powder and a method for producing the same. More specifically, the invention relates to an indium oxide powder used as the raw material of a high density ITO (indium oxide containing tin oxide (indium-tin-oxide)) for forming a transparent conductive film and as the raw material of IZO (indium oxide containing zinc oxide (indium-zinc-oxide)) for producing a sputtering target.

2. Description of the Prior Art

As a conventional method for producing indium oxide, there is known a method for producing indium oxide by directly oxidizing indium metal or an indium salt to decompose it. There is also known a method for producing indium oxide, the method comprising the steps of: adding a basic precipitant, such as NaOH, $NH_4OH$ or $NH_4HCO_3$, to an aqueous indium salt solution to obtain a hydroxide; drying the hydroxide; and burning the dried hydroxide in the atmosphere (Japanese Patent Laid-Open No. 2003-277052, and Japanese Patent Publication No. 7-42109).

However, in the method for directly oxidizing indium metal or an indium salt to decompose it, there is an environmental issue in that a large amount of nitrogen oxides are produced if an indium salt is decomposed, and it is difficult to sufficiently oxide the central portion of the lump of indium metal if indium metal is oxidized. In addition, indium oxide obtained by this method is a hard lump, so that it is difficult to grind the hard lump. Moreover, indium oxide obtained by the above described methods contains many rough particles, so that it is difficult to produce uniform particles.

Indium oxide powders obtained by the above described conventional methods have large particle diameters, and are hard particles. In order to obtain a high density ITO target, it is required to uniformly disperse fine indium oxide powder and fine tin oxide powder. If rough particles exist in indium oxide, the packaging property and uniformity thereof are deteriorated, so that holes and cracks are easily formed during sintering. In addition, if the presence of tin is biased, the composition of target is shifted to cause the function of tin as a carrier to be insufficient, so that conductivity is deteriorated. Therefore, indium oxide powders obtained by the above described conventional methods are bulky and hard powders, so that it is required to grind the powders by means of a beads mill or the like in order to produce a high density target. However, it takes a lot of time to carry out such a process (a wet mixing/dispersing process), so that productivity is deteriorated. In addition, there is a problem in that impurities are mixed in the powders by contamination from media, so that electric characteristics of films produced from the powders are deteriorated. Moreover, there is a problem in that uneven sintering is caused during sintering, so that cracks are easily produced.

SUMMARY OF THE INVENTION

It is therefore an object of the present invention to eliminate the aforementioned problems and to provide an indium oxide powder which can be dispersed and fined as particles having uniform particle diameters by a simple process such as crashing and which can be uniformly mixed and dispersed in a tin oxide powder in a short time, and a method for producing the same. It is another object of the present invention to provide an indium oxide powder which can be used for producing a high density sintered body having a relative density of not less than 98.5% for a sputtering target, and a method for producing the same.

In order to accomplish the aforementioned and other objects, the inventors have diligently studied and found that it is possible to improve characteristics of an indium oxide powder to accomplish the aforementioned and other objects by a method comprising the steps of: adding a basic precipitant to an indium salt solution; drying a precipitate obtained from the solution by a solid-liquid separation; and calcining the precipitate in an non-oxidizing atmosphere, and preferably adjusting characteristics and calcining conditions of indium hydroxide which is a precursor of the indium oxide powder. Thus, the inventors have made the present invention.

According one aspect of the present invention, there is provided a method for producing an indium oxide powder, the method comprising the steps of: adding a basic precipitant to an indium salt solution to produce a precipitate; separating the precipitate by a solid-liquid separation; drying the separated precipitate; and calcining the dried precipitate in a non-oxidizing atmosphere. In this method for producing an indium oxide powder, the dried precipitate is preferably calcined at a temperature of 570 to 780° C.

In the above described method for producing an indium oxide powder, the concentration of indium in the indium salt solution is preferably in the range of from 0.01 M to 3 M, and the basic precipitant is preferably added to the indium salt solution in an adding time of not longer than 24 hours while the solution is maintained at a temperature of 5 to 95° C. until the equivalent of the precipitant reaches an equivalent of 0.5 to 3, the dried precipitate being calcined at a temperature of 570 to 780° C.

In the above described method for producing an indium oxide powder, the non-oxidizing atmosphere preferably contains at least one selected from the group consisting of nitrogen, hydrogen, ammonia gas and water vapor. The indium salt solution is preferably an indium salt solution of at least one selected from the group consisting of $In_2(C_2O_4)_3$, $InCl_3$, $In(NO_3)_3$ and $In_2(SO_4)_3$. The basic precipitant is preferably at least one selected from the group consisting of NaOH, KOH, $NH_4OH$, $NH_3$ gas, $NH_4HCO_3$ and $(NH_4)_2CO_3$.

According to another aspect of the present invention, there is provided a method for producing an indium oxide powder containing a tin oxide powder, wherein 80 to 95% by weight of an indium oxide powder produced by the above described method for producing an indium oxide powder is mixed with 5 to 20% by weight of a tin oxide powder.

According to a further aspect of the present invention, there is provided a method for producing an ITO target, the method comprising the steps of: mixing 80 to 95% by weight of an indium oxide powder, which is produced by the above described method for producing an indium oxide powder, with 5 to 20% by weight of a tin oxide powder; pressing a mixture of the indium oxide powder and the tin oxide powder; and burning the pressed mixture at a temperature of 1200 to 1600° C. In this method for producing an ITO target, an ITO target obtained by the burning preferably has a sintered density of 7.04 to 7.15 g/cm³.

According to a still further aspect of the present invention, there is provided an indium oxide powder having a mean particle diameter $D_{50}$ of 0.05 to 0.7 micrometers, a maximum particle diameter $D_{max}$ of 0.05 to 1.2 micrometers, and a BET specific surface area of 7 to 18 m²/g, wherein a ratio of a compacted density of the indium oxide powder to a bulk density thereof is not less than 7.

According to the present invention, it is possible to produce an indium oxide powder which can be dispersed and fined as particles having uniform particle diameters by a simple process such as crashing and which can be uniformly mixed and dispersed in a tin oxide powder in a short time. It is also possible to use the indium oxide powder thus obtained for producing a high density sintered body having a relative density of not less than 98.5% for a sputtering target.

DESCRIPTION OF THE PREFERRED EMBODIMENTS

In a preferred embodiment of a method for producing an indium oxide powder according to the present invention, at least one basic precipitant selected from the group consisting of NaOH, KOH, $NH_4OH$, $NH_3$, $NH_4HCO_3$ and $(NH_4)_2CO_3$ is added to an indium salt solution, which contains 0.01 to 3 M of indium, preferably 0.1 to 1.5 M of indium, in an adding time of not longer than 24 hours, preferably in an adding time of 20 to 120 minutes, while the solution is maintained at a temperature of 5 to 95° C., preferably at a temperature of 40 to 70° C., until the equivalent of the precipitant reaches an equivalent of 0.5 to 3, preferably an equivalent of 0.8 to 1.7. Then, a precipitate obtained from the solution by a solid-liquid separation is dried and calcined at a temperature of 300 to 800° C., preferably at a temperature of 570 to 780° C., for 10 minutes to 12 hours, preferably for 30 minutes to 6 hours, in an non-oxidizing atmosphere which contains at least one of nitrogen, hydrogen, ammonia gas and water vapor. Then, a calcined body thus obtained is crashed to obtain an indium oxide powder.

The indium salt solution serving as the raw material of indium oxide may be obtained by dissolving indium metal in $H_2C_2O_4$, $HNO_3$, HCl, $H_2SO_4$ or the like. The acid used for dissolving indium metal should not particularly be limited, and is preferably $HNO_3$. The concentration of indium in the indium salt solution is adjusted so as to be 0.01 to 3 M, preferably 0.1 to 1.5 M, before a neutralization reaction. If the concentration of indium is not less than 3M, particles of a hydroxide serving as a precursor of the oxide are aggregated, so that it is difficult to produce particles having uniform particle diameters.

At least one selected from the group consisting of NaOH, KOH, $NH_4OH$, $NH_3$ gas, $NH_4HCO_3$ and $(NH_4)_2CO_3$ is added to the above described indium salt solution as a basic precipitant to produce a precipitate of indium hydroxide. Among these precipitants, $NH_4OH$, $NH_3$ gas or $NH_4HCO_3$ is preferably used. In order to produce the precipitant of indium hydroxide, the above described basic precipitant is added to the solution in an adding time of not longer than 24 hours, preferably in an adding time of 20 to 120 minutes, while the solution is maintained at a temperature of 5 to 95° C., preferably at a temperature of 40 to 70° C., until the equivalent of the precipitant reaches an equivalent of 0.5 to 3, preferably an equivalent of 0.8 to 1.7. Then, the precipitate of indium hydroxide is separated by a solid-liquid separation. Furthermore, the precipitate thus produced is preferably washed with water, the amount of which is equal to or more than the amount of the slurry of the precipitate. If the equivalent of the precipitant is less than 0.5, the amount of unprecipitated matters is large, and if the equivalent of the precipitant exceeds 3, particles are strongly agglutinative, so that it takes a lot of time to clean the precipitate. Thus, the concentration of indium, the temperature of the reaction solution, the adding time of the precipitant and the amount of the added precipitant, which are main factors for determining the properties of the hydroxide, are suitably combined, so that it is possible to simply produce particles of the hydroxide having relatively uniform desired particle diameters. The shape of particles of the hydroxide may be any one of various shapes, such as sphere, needle, grain and board, by the above described combinations, and is preferably spherical. It is possible to produce more uniform particles by adding an operation, such as the aging of the reaction slurry.

After indium hydroxide thus obtained is dried at a temperature of 80 to 200° C., preferably at a temperature of 100 to 150° C, the dried indium hydroxide is calcined at a temperature of 300 to 800° C., preferably at a temperature of 570 to 780° C., for 10 minutes to 12 hours, preferably form 30 minutes to 6 hours, in a non-oxidizing atmosphere which contains at least one of nitrogen, hydrogen, ammonia gas and water vapor, preferably in an inert gas atmosphere which contains ammonia gas and water vapor, to be crashed to obtain an indium oxide powder. The calcining atmosphere preferably contains a reducing gas. As the reduction property of the atmosphere is stronger, sintering in particles can be further promoted. As the inert gas, helium or argon may be substituted for nitrogen. If the calcining temperature is lower than 300° C., it is insufficient to decompose the hydroxide, and if the calcining temperature exceeds 800° C., the amount of particles aggregated by sintering is increased, so that the dispersibility of the particles is deteriorated. Thus, indium oxide having a maximum particle diameter $D_{max}$ of not greater than 1.2 micrometers can be easily obtained by suitably combining the calcining temperature with the reduction property of the atmosphere. The indium oxide powder thus obtained can promote the sintering in particles, i.e., can prevent the diameter of secondary particles from increasing although the diameter of primary particles increases. In addition, if the calcining atmosphere contains water vapor, it is possible to inhibit the aggregation of indium oxide to be obtained.

An indium oxide powder, which is produced by the above described preferred embodiment of a method for producing an indium oxide powder according to the present invention, has a mean particle diameter $D_{50}$ of 0.05 to 0.7 micrometers, a maximum particle diameter $D_{max}$ of 0.05 to 1.2 micrometers, a BET specific surface area (a specific surface area obtained by the BET one-point method) of 7 to 18 $m^2/g$, preferably 9 to 12 $m^2/g$. In addition, a value obtained by dividing a compacted density of the indium oxide powder (a density of a pellet obtained by uniaxially compacting the indium oxide powder at a compacting pressure of 2 ton/$cm^2$ by means of a die having a diameter of 10 mm) by a bulk density (a bulk density based on JIS K5101) is not less than 7, and preferably not less than 10. Furthermore, the mean particle diameter $D_{50}$ and the maximum particle diameter $D_{max}$ are diameters measured by means of a laser diffraction type particle size distribution measuring device (MICROTRACK HRA9320-X100) after 0.03 g of a sample is mixed in 30 ml of pure water to be dispersed for three minutes by means of an ultrasonic disperser having a power of 150 W.

That is, an indium oxide powder having a mean particle diameter $D_{50}$ of not greater than 0.7 micrometers, a maximum particle diameter $D_{max}$ of not greater than 1.2 micrometers and a BET specific surface area of 7 to 18 $m^2/g$ can be easily produced by the above described preferred embodiment of a method for producing an indium oxide powder according to the present invention. If the maximum particle diameter $D_{max}$ exceeds 1.2 micrometers, it takes a lot of time to carry out the wet mixing/dispersing process when a sputtering target is produced, so that there is some possibility that the indium oxide powder is not uniformly mixed with a tin oxide powder. As a result, it is difficult to produce a target having a high sintered density and a small number of cracks and nodules. If the BET specific surface area is less than 7 m²/g, sintering can not easily carried out, and if the BET specific surface area exceeds 18 m²/g, spaces between particles and irregularities on the surface are increased. In either case, it is difficult to obtain a high sintered density. When the BET specific surface area exceeds 18 m²/g, cracks are easily produced by an increase in rate of shrinkage during sintering. If the value obtained by dividing the compacted density by the bulk density is less than 7, the packing property of the indium oxide powder is deteriorated. Also in this case, it is difficult to produce a target having a high sintered density and a small number of cracks and nodules.

After 80 to 95% by weight of an indium oxide powder produced by the above described preferred embodiment of a method for producing an indium oxide powder according to the present invention is mixed with 5 to 20% by weight of a tin oxide powder to produce an indium-tin-oxide powder (an indium oxide powder containing a tin oxide powder), the indium-tin-oxide powder is pressed, and then, burned to produce a high density sintered body having a relative density of not less than 98.5% for a sputtering target.

That is, 5 to 20% by weight of a tin oxide powder is added to 80 to 95% by weight of an indium oxide powder, which is produced by the above described preferred embodiment of a method for producing an indium oxide powder according to the present invention, to obtain a uniform mixture by means of a mixer/disperser, such as a ball mill. The tin oxide powder may be a commercially available tin oxide powder, and is preferably a tin oxide powder in which the amount of impurities is small and which has a good dispersibility. If the amount of the tin oxide powder exceeds 20% by weight or if is less than 5% by weight, the electric and optical characteristics of a film produced from the indium-tin-oxide powder are deteriorated. The granulation and drying of the mixture may be carried out by means of a spray dryer or the like. The method for compacting the mixture may be the cold pressing using a die or the cold isostatic pressing using a rubber die, and the latter is preferably used. The compacting pressure is a cold compacting pressure of 1.0 to 3.0 ton/cm². In order to cause the relative density of a sintered body to be 98.5% or more, the compacting pressure must be 1.0 ton/cm² or more. The pressed material processed on such conditions is burned at a temperature of 1200 to 1600° C. to produce a sputtering target. If the burning temperature is lower than 1200° C., burning is insufficient to form a complete solid solution of indium and tin, so that it is not possible to obtain a high sintered density. On the other hand, if the burning temperature exceeds 1600° C., indium and tin are volatilized to deteriorate yields, so that productivity is deteriorated. By such a method, it is possible to easily produce a high density sintered body having a relative density of not less than 98.5% (a sintered density of not less than 7.04 g/cm³).

As described above, in a preferred embodiment of a method for producing an indium oxide powder according to the present invention, the concentration of an indium salt solution, the temperature of a reaction solution, and the adding time of a precipitant are combined in the production of indium hydroxide by a wet reaction, to control properties of particles of a hydroxide. In addition, the hydroxide is calcined at a low calcining temperature in a non-oxidizing atmosphere, so that it is possible to produce an indium oxide powder having a maximum particle diameter $D_{max}$ (a diameter at 100% in a particle size distribution of the powder) of 0.05 to 1.2 micrometers and a good dispersibility.

That is, in a preferred embodiment of a method for producing an indium oxide powder according to the present invention, it is possible to control properties, such as a particle diameter, of indium hydroxide obtained as an intermediate product when indium oxide is produced by a wet reaction, and it is possible to inhibit the particle size of an indium oxide powder from increasing. In addition, it is possible to produce an indium oxide powder having a good dispersibility. Since the indium oxide powder has a good dispersibility, the density of a pressed compact thereof is increased although the bulk density of the indium oxide powder is low. Therefore, it is possible to easily obtain a high density indium oxide powder, and it is difficult to produce cracks even if the compact of the powder is burned. Thus, it is possible to shorten the time to carry out a wet mixing/dispersing process when a sputtering target is produced, and it is possible to inexpensively produce a high density sintered body having a target relative density of not less than 98.5% by a burning process at an atmospheric pressure.

Examples of an indium oxide powder and a method for producing the same according to the present invention will be described below in detail.

EXAMPLE 1

Pure water was added to an indium nitrate solution to be adjusted so that the concentration of indium was 0.53 M. Then, 7% by weight of aqueous ammonia serving as a basic precipitant was added to the indium salt solution in 25 minutes while preventing the temperature of the solution from exceeding 60° C. until the equivalent of the basic precipitant reached 1.5. Thus, a precipitate of a hydroxide was obtained. After the precipitate was filtered, washed and dried at 150° C., it was calcined at a temperature of 600° C. in a nitrogen atmosphere containing ammonia gas and water vapor to be crashed. The means particle diameter $D_{50}$ of an indium oxide powder thus obtained was 0.42 micrometers, and the maximum particle diameter $D_{max}$ thereof was 0.82 micrometers. In addition, the BET specific surface area of the indium oxide powder was 12.4 m²/g, and the ratio of the compacted density to the bulk density (the ratio of compacted density/bulk density) thereof was 11.1.

After 10% by weight of a tin oxide powder was added to the indium oxide powder to be mixed therein, the mixture was pressed at a compacting pressure of 2 ton/cm² and burned at 1600° C. to produce a sintered body of ITO. The sintered density of the sintered body was 7.12 g/cm³.

EXAMPLE 2

A dried hydroxide obtained by the same method as that in Example 1 was calcined at a temperature of 700° C. in a nitrogen atmosphere containing ammonia gas and water vapor to be crashed. The means particle diameter $D_{50}$ of an indium oxide powder thus obtained was 0.41 micrometers, and the maximum particle diameter $D_{max}$ thereof was 0.82 micrometers. In addition, the BET specific surface area of the indium oxide powder was 10.7 m²/g, and the ratio of compacted density/bulk density thereof was 11.0.

After 10% by weight of a tin oxide powder was added to the indium oxide powder to be mixed therein, the mixture was pressed at a compacting pressure of 2 ton/cm² and burned at 1600° C. to produce a sintered body of ITO. The sintered density of the sintered body was 7.12 g/cm³.

EXAMPLE 3

A dried hydroxide obtained by the same method as that in Example 1 was calcined at a temperature of 750° C. in a nitrogen atmosphere containing ammonia gas and water vapor to be crashed. The means particle diameter $D_{50}$ of an indium oxide powder thus obtained was 0.41 micrometers, and the maximum particle diameter $D_{max}$ thereof was 0.97 micrometers. In addition, the BET specific surface area of the indium oxide powder was 7.5 m$^2$/g, and the ratio of compacted density/bulk density thereof was 11.6.

After 10% by weight of a tin oxide powder was added to the indium oxide powder to be mixed therein, the mixture was pressed at a compacting pressure of 2 ton/cm$^2$ and burned at 1600° C. to produce a sintered body of ITO. The sintered density of the sintered body was 7.13 g/cm$^3$.

EXAMPLE 4

Pure water was added to an indium nitrate solution to be adjusted so that the concentration of indium is 0.24 M. Then, 100% by volume of aqueous gas serving as a basic precipitant was added to the indium salt solution in 20 minutes while preventing the temperature of the solution from exceeding 85° C. until the equivalent of the basic precipitant reached 1.5. Thus, a precipitate of a hydroxide was obtained. After the precipitate was filtered, washed and dried at 110° C., it was calcined at a temperature of 600° C. in a nitrogen atmosphere containing ammonia gas and water vapor to be crashed. The means particle diameter $D_{50}$ of an indium oxide powder thus obtained was 0.43 micrometers, and the maximum particle diameter $D_{max}$ thereof was 0.97 micrometers. In addition, the BET specific surface area of the indium oxide powder was 11.0 m$^2$/g, and the ratio of compacted density/bulk density thereof was 10.9.

After 10% by weight of a tin oxide powder was added to the indium oxide powder to be mixed therein, the mixture was pressed at a compacting pressure of 2 ton/cm$^2$ and burned at 1600° C. to produce a sintered body of ITO. The sintered density of the sintered body was 7.11 g/cm$^3$.

EXAMPLE 5

Pure water was added to an indium nitrate solution to be adjusted so that the concentration of indium is 0.53 M. Then, 7% by weight of aqueous ammonia serving as a basic precipitant was added to the indium salt solution in 25 minutes while preventing the temperature of the solution from exceeding 50° C. until the equivalent of the basic precipitant reached 1.5. Thus, a precipitate of a hydroxide was obtained. After the precipitate was filtered, washed and dried at 150° C., it was calcined at a temperature of 700° C. in a nitrogen atmosphere containing ammonia gas and water vapor to be crashed. The means particle diameter $D_{50}$ of an indium oxide powder thus obtained was 0.40 micrometers, and the maximum particle diameter $D_{max}$ thereof was 0.97 micrometers. In addition, the BET specific surface area of the indium oxide powder was 11.6 m$^2$/g, and the ratio of compacted density/bulk density thereof was 11.0.

After 10% by weight of a tin oxide powder was added to the indium oxide powder to be mixed therein, the mixture was pressed at a compacting pressure of 2 ton/cm$^2$ and burned at 1600° C. to produce a sintered body of ITO. The sintered density of the sintered body was 7.10 g/cm$^3$.

EXAMPLE 6

Pure water was added to an indium nitrate solution to be adjusted so that the concentration of indium is 0.53 M. Then, 7% by weight of aqueous ammonia serving as a basic precipitant was added to the indium salt solution in 10 minutes while preventing the temperature of the solution from exceeding 70° C. until the equivalent of the basic precipitant reached 1.5. Thus, a precipitate of a hydroxide was obtained. After the precipitate was filtered, washed and dried at 150° C., it was calcined at a temperature of 630° C. in a nitrogen atmosphere containing ammonia gas and water vapor to be crashed. The means particle diameter $D_{50}$ of an indium oxide powder thus obtained was 0.34 micrometers, and the maximum particle diameter $D_{max}$ thereof was 0.69 micrometers. In addition, the BET specific surface area of the indium oxide powder was 12.8 m$^2$/g, and the ratio of compacted density/bulk density thereof was 11.5.

After 10% by weight of a tin oxide powder was added to the indium oxide powder to be mixed therein, the mixture was pressed at a compacting pressure of 2 ton/cm$^2$ and burned at 1600° C. to produce a sintered body of ITO. The sintered density of the sintered body was 7.11 g/cm$^3$.

EXAMPLE 7

Pure water was added to an indium nitrate solution to be adjusted so that the concentration of indium is 0.78 M. Then, 10% by weight of aqueous ammonia serving as a basic precipitant was added to the indium salt solution in 25 minutes while preventing the temperature of the solution from exceeding 30° C. until the equivalent of the basic precipitant reached 1.5. Thus, a precipitate of a hydroxide was obtained. After the precipitate was filtered, washed and dried at 150° C., it was calcined at a temperature of 630° C. in a nitrogen atmosphere containing ammonia gas and water vapor to be crashed. The means particle diameter $D_{50}$ of an indium oxide powder thus obtained was 0.37 micrometers, and the maximum particle diameter $D_{max}$ thereof was 1.16 micrometers. In addition, the BET specific surface area of the indium oxide powder was 13.5 m$^2$/g, and the ratio of compacted density/bulk density thereof was 11.5.

After 10% by weight of a tin oxide powder was added to the indium oxide powder to be mixed therein, the mixture was pressed at a compacting pressure of 2 ton/cm$^2$ and burned at 1600° C. to produce a sintered body of ITO. The sintered density of the sintered body was 7.12 g/cm$^3$.

EXAMPLE 8

Pure water was added to an indium nitrate solution to be adjusted so that the concentration of indium is 0.26 M. Then, 3% by weight of aqueous ammonia serving as a basic precipitant was added to the indium salt solution in 60 minutes while preventing the temperature of the solution from exceeding 40° C. until the equivalent of the basic precipitant reached 1.5. Thus, a precipitate of a hydroxide was obtained. After the precipitate was filtered, washed and dried at 150° C., it was calcined at a temperature of 630° C. in a nitrogen atmosphere containing ammonia gas and water vapor to be crashed. The means particle diameter $D_{50}$ of an indium oxide powder thus obtained was 0.40 micrometers, and the maximum particle diameter $D_{max}$ thereof was 0.82 micrometers. In addition, the BET specific surface area of the indium oxide powder was 11.1 m$^2$/g, and the ratio of compacted density/bulk density thereof was 10.2.

After 10% by weight of a tin oxide powder was added to the indium oxide powder to be mixed therein, the mixture was pressed at a compacting pressure of 2 ton/cm$^2$ and burned at 1600° C. to produce a sintered body of ITO. The sintered density of the sintered body was 7.10 g/cm$^3$.

COMPARATIVE EXAMPLE 1

A dried hydroxide obtained by the same method as that in Example 1 was calcined at a temperature of 450° C. in a nitrogen atmosphere containing ammonia gas and water vapor to be crashed. The means particle diameter $D_{50}$ of an indium oxide powder thus obtained was 0.41 micrometers, and the maximum particle diameter $D_{max}$ thereof was 0.97 micrometers. In addition, the BET specific surface area of the indium oxide powder was 64.5 m$^2$/g, and the ratio of compacted density/bulk density thereof was 9.9.

After 10% by weight of a tin oxide powder was added to the indium oxide powder to be mixed therein, the mixture was pressed at a compacting pressure of 2 ton/cm$^2$ and burned at 1600° C. to produce a sintered body of ITO. The sintered density of the sintered body was 6.91 g/cm$^3$.

COMPARATIVE EXAMPLE 2

A dried hydroxide obtained by the same method as that in Example 1 was calcined at a temperature of 550° C. in a nitrogen atmosphere containing ammonia gas and water vapor to be crashed. The means particle diameter $D_{50}$ of an indium oxide powder thus obtained was 0.42 micrometers, and the maximum particle diameter $D_{max}$ thereof was 0.82 micrometers. In addition, the BET specific surface area of the indium oxide powder was 20.2 m$^2$/g, and the ratio of compacted density/bulk density thereof was 10.2.

After 10% by weight of a tin oxide powder was added to the indium oxide powder to be mixed therein, the mixture was pressed at a compacting pressure of 2 ton/cm$^2$ and burned at 1600° C. to produce a sintered body of ITO. The sintered density of the sintered body was 6.95 g/cm$^3$.

COMPARATIVE EXAMPLE 3

A dried hydroxide obtained by the same method as that in Example 1 was calcined at a temperature of 800° C. in a nitrogen atmosphere containing ammonia gas and water vapor to be crashed. The means particle diameter $D_{50}$ of an indium oxide powder thus obtained was 0.52 micrometers, and the maximum particle diameter $D_{max}$ thereof was 1.16 micrometers. In addition, the BET specific surface area of the indium oxide powder was 5.4 m$^2$/g, and the ratio of compacted density/bulk density thereof was 9.5.

After 10% by weight of a tin oxide powder was added to the indium oxide powder to be mixed therein, the mixture was pressed at a compacting pressure of 2 ton/cm$^2$ and burned at 1600° C. to produce a sintered body of ITO. The sintered density of the sintered body was 6.85 g/cm$^3$.

COMPARATIVE EXAMPLE 4

A dried hydroxide obtained by the same method as that in Example 1 was calcined at a temperature of 700° C. in the atmosphere to be crashed. The means particle diameter $D_{50}$ of an indium oxide powder thus obtained was 0.44 micrometers, and the maximum particle diameter $D_{max}$ thereof was 11.00 micrometers. In addition, the BET specific surface area of the indium oxide powder was 18.2 m$^2$/g, and the ratio of compacted density/bulk density thereof was 9.0.

After 10% by weight of a tin oxide powder was added to the indium oxide powder to be mixed therein, the mixture was pressed at a compacting pressure of 2 ton/cm$^2$ and burned at 1600° C. to produce a sintered body of ITO. The sintered density of the sintered body was 6.98 g/cm$^3$.

COMPARATIVE EXAMPLE 5

A dried hydroxide obtained by the same method as that in Example 1 was calcined at a temperature of 800° C. in the atmosphere to be crashed. The means particle diameter $D_{50}$ of an indium oxide powder thus obtained was 0.57 micrometers, and the maximum particle diameter $D_{max}$ thereof was 37.00 micrometers. In addition, the BET specific surface area of the indium oxide powder was 10.7 m$^2$/g, and the ratio of compacted density/bulk density thereof was 5.4.

After 10% by weight of a tin oxide powder was added to the indium oxide powder to be mixed therein, the mixture was pressed at a compacting pressure of 2 ton/cm$^2$ and burned at 1600° C. to produce a sintered body of ITO. The sintered density of the sintered body was 6.90 g/cm$^3$.

COMPARATIVE EXAMPLE 6

A dried hydroxide obtained by the same method as that in Example 1 was calcined at a temperature of 1000° C. in the atmosphere to be crashed. The means particle diameter $D_{50}$ of an indium oxide powder thus obtained was 0.57 micrometers, and the maximum particle diameter $D_{max}$ thereof was 52.33 micrometers. In addition, the BET specific surface area of the indium oxide powder was 9.5 m$^2$/g, and the ratio of compacted density/bulk density thereof was 4.7.

After 10% by weight of a tin oxide powder was added to the indium oxide powder to be mixed therein, the mixture was pressed at a compacting pressure of 2 ton/cm$^2$ and burned at 1600° C. to produce a sintered body of ITO. The sintered density of the sintered body was 6.93 g/cm$^3$.

COMPARATIVE EXAMPLE 7

A dried hydroxide obtained by the same method as that in Example 1 was calcined at a temperature of 1100° C. in the atmosphere to be crashed. The means particle diameter $D_{50}$ of an indium oxide powder thus obtained was 0.54 micrometers, and the maximum particle diameter $D_{max}$ thereof was 62.23 micrometers. In addition, the BET specific surface area of the indium oxide powder was 5.8 m$^2$/g, and the ratio of compacted density/bulk density thereof was 4.0.

After 10% by weight of a tin oxide powder was added to the indium oxide powder to be mixed therein, the mixture was pressed at a compacting pressure of 2 ton/cm$^2$ and burned at 1600° C. to produce a sintered body of ITO. The sintered density of the sintered body was 6.85 g/cm$^3$.

COMPARATIVE EXAMPLE 8

A dried hydroxide obtained by the same method as that in Example 1 was calcined at a temperature of 1200° C. in the atmosphere to be crashed. The means particle diameter $D_{50}$ of an indium oxide powder thus obtained was 0.71 micrometers, and the maximum particle diameter $D_{max}$ thereof was 37.00 micrometers. In addition, the BET specific surface area of the indium oxide powder was 2.8 m$^2$/g, and the ratio of compacted density/bulk density thereof was 3.2.

After 10% by weight of a tin oxide powder was added to the indium oxide powder to be mixed therein, the mixture was pressed at a compacting pressure of 2 ton/cm$^2$ and burned at 1600° C. to produce a sintered body of ITO. The sintered density of the sintered body was 6.82 g/cm$^3$.

The conditions for the production of indium oxide powders in Examples 1 through 8 and Comparative Examples 1 through 8 are shown in Table 1, and characteristics of the indium oxide powders and ITO sintered bodies are shown in Table 2. It can be seen from Tables 1 and 2 that it is possible to easily obtain an ITO sintered body, which has a sintered density of not less than 7.1 g/cm³ and which can be used as an ITO target, by using indium oxide powders in Examples 1 through 8 obtained by calcining a hydroxide at a low temperature in a non-oxidizing atmosphere after controlling properties of particles of the hydroxide by combining the concentration of indium, the temperature of a reaction and the time to add a precipitant.

TABLE 1

|  | Concentration of Indium (M) | Basic Precipitant | Time to Add Precipitant (min) | Reaction Temp. (° C.) | Burning Atmosphere | Burning Temp. (° C.) |
| --- | --- | --- | --- | --- | --- | --- |
| Ex. 1 | 0.53 | $NH_4OH$ | 25 | 60 | $H_2O$, $NH_3$, $N_2$ | 600 |
| Ex. 2 | 0.53 | $NH_4OH$ | 25 | 60 | $H_2O$, $NH_3$, $N_2$ | 700 |
| Ex. 3 | 0.53 | $NH_4OH$ | 25 | 60 | $H_2O$, $NH_3$, $N_2$ | 750 |
| Ex. 4 | 0.24 | $NH_3$ | 20 | 85 | $H_2O$, $NH_3$, $N_2$ | 600 |
| Ex. 5 | 0.53 | $NH_4OH$ | 25 | 50 | $H_2O$, $NH_3$, $N_2$ | 700 |
| Ex. 6 | 0.53 | $NH_4OH$ | 10 | 70 | $H_2O$, $NH_3$, $N_2$ | 630 |
| Ex. 7 | 0.78 | $NH_4OH$ | 25 | 30 | $H_2O$, $NH_3$, $N_2$ | 630 |
| Ex. 8 | 0.26 | $NH_4OH$ | 60 | 40 | $H_2O$, $NH_3$, $N_2$ | 630 |
| Comp. 1 | 0.53 | $NH_4OH$ | 25 | 60 | $H_2O$, $NH_3$, $N_2$ | 450 |
| Comp. 2 | 0.53 | $NH_4OH$ | 25 | 60 | $H_2O$, $NH_3$, $N_2$ | 550 |
| Comp. 3 | 0.53 | $NH_4OH$ | 25 | 60 | $H_2O$, $NH_3$, $N_2$ | 800 |
| Comp. 4 | 0.53 | $NH_4OH$ | 25 | 60 | Air | 700 |
| Comp. 5 | 0.53 | $NH_4OH$ | 25 | 60 | Air | 800 |
| Comp. 6 | 0.53 | $NH_4OH$ | 25 | 60 | Air | 1000 |
| Comp. 7 | 0.53 | $NH_4OH$ | 25 | 60 | Air | 1100 |
| Comp. 8 | 0.53 | $NH_4OH$ | 25 | 60 | Air | 1200 |

TABLE 2

|  | BET ($m^2$/g) | $D_{50}$ (μm) | $D_{max}$ (μm) | Bulk Density (g/ml) | Compacted Density (g/cm³) | Compacted Density/ Bulk Density | Sintered Density (g/cm³) |
| --- | --- | --- | --- | --- | --- | --- | --- |
| Ex. 1 | 12.4 | 0.42 | 0.82 | 0.33 | 3.61 | 11.1 | 7.12 |
| Ex. 2 | 10.7 | 0.41 | 0.82 | 0.34 | 3.68 | 11.0 | 7.12 |
| Ex. 3 | 7.5 | 0.41 | 0.97 | 0.33 | 3.78 | 11.6 | 7.13 |
| Ex. 4 | 11.0 | 0.43 | 0.97 | 0.35 | 3.77 | 10.9 | 7.11 |
| Ex. 5 | 11.6 | 0.40 | 0.97 | 0.33 | 3.67 | 11.0 | 7.10 |
| Ex. 6 | 12.8 | 0.34 | 0.69 | 0.33 | 3.74 | 11.5 | 7.11 |
| Ex. 7 | 13.5 | 0.37 | 1.16 | 0.32 | 3.69 | 11.5 | 7.12 |
| Ex. 8 | 11.1 | 0.40 | 0.82 | 0.38 | 3.91 | 10.2 | 7.10 |
| Comp. 1 | 64.5 | 0.41 | 0.97 | 0.27 | 2.65 | 9.9 | 6.91 |
| Comp. 2 | 20.2 | 0.42 | 0.82 | 0.33 | 3.41 | 10.2 | 6.95 |
| Comp. 3 | 5.4 | 0.52 | 1.16 | 0.41 | 3.89 | 9.5 | 6.85 |
| Comp. 4 | 18.2 | 0.44 | 11.00 | 0.37 | 3.30 | 9.0 | 6.98 |
| Comp. 5 | 10.7 | 0.57 | 37.00 | 0.64 | 3.45 | 5.4 | 6.90 |
| Comp. 6 | 9.5 | 0.57 | 52.33 | 0.74 | 3.52 | 4.7 | 6.93 |
| Comp. 7 | 5.8 | 0.54 | 62.23 | 0.93 | 3.74 | 4.0 | 6.85 |
| Comp. 8 | 2.8 | 0.71 | 37.00 | 1.24 | 3.92 | 3.2 | 6.98 |

What is claimed is:

1. A method for producing an indium oxide powder, the method comprising the steps of:
    adding a basic precipitant to an indium salt solution to produce a precipitate;
    separating the precipitate by a solid-liquid separation;
    drying the separated precipitate; and
    calcining the dried precipitate in an inert gas atmosphere which contains a reducing gas and water vapor,
    wherein the concentration of indium in said indium salt solution is in the range of from 0.01 M to 3 M, and said basic precipitant is added to said indium salt solution in an amount of 0.5 to 3 equivalents per equivalent of the indium salt of said indium salt solution in an adding time of not longer than 24 hours while the solution is maintained at a temperature of 5 to 95° C., said dried precipitate being calcined at a temperature of 570 to 780° C.

2. A method for producing an indium oxide powder as set forth in claim 1, wherein said reducing gas is at least one selected from the group consisting of hydrogen gas and ammonia gas.

3. A method for producing an indium oxide powder as set forth in claim 1, wherein said indium salt solution is an indium salt solution of at least one selected from the group consisting of $In_2(C_2O_4)_3$, $InCl_3$, $In(NO_3)_3$ and $In_2(SO_4)_3$.

4. A method for producing an indium oxide powder as set forth in claim 1, wherein said basic precipitant is at least one selected from the group consisting of NaOH, KOH, $NH_4OH$, $NH_3$ gas, $NH_4HCO_3$ and $(NH_4)_2CO_3$.

5. A method for producing an indium oxide powder containing a tin oxide powder, the method comprising the steps of:
    adding a basic precipitant to an indium salt solution to produce a precipitate;
    separating the precipitate by a solid-liquid separation;
    drying the separated precipitate;
    calcining the dried precipitate in an inert gas atmosphere to obtain an indium oxide powder; and
    mixing 80 to 95% by weight of the indium oxide powder with 5 to 20% by weight of a tin oxide powder,
    wherein the concentration of indium in said indium salt solution is in the range of from 0.01 M to 3 M, and said basic precipitant is added to said indium salt solution in an amount of 0.5 to 3 equivalents per equivalent of the indium salt of said indium salt solution in an adding time of not longer than 24 hours while the solution is maintained at a temperature of 5 to 95° C., said dried precipitate being calcined at a temperature of 570 to 780° C.

6. A method for producing an ITO target, the method comprising the steps of:
    adding a basic precipitant to an indium salt solution to produce a precipitate;

separating the precipitate by a solid-liquid separation;
drying the separated precipitate;
calcining the dried precipitate in an inert gas atmosphere to obtain an indium oxide powder;
mixing 80 to 95% by weight of the indium oxide powder with 5 to 20% by weight of a tin oxide powder;
pressing a mixture of the indium oxide powder and the tin oxide powder; and
burning the pressed mixture at a temperature of 1200 to 1600° C.,
wherein the concentration of indium in said indium salt solution is in the range of from 0.01 M to 3 M, and said basic precipitant is added to said indium salt solution in an amount of 0.5 to 3 equivalents per equivalent of the indium salt of said indium salt solution in an adding time of not longer than 24 hours while the solution is maintained at a temperature of 5 to 95° C., said dried precipitate being calcined at a temperature of 570 to 780° C.

7. A method for producing an ITO target as set forth in claim 6, wherein an ITO target obtained by the burning has a sintered density of 7.04 to 7.15 g/cm$^3$.

* * * * *